(12) United States Patent
Martin Hernandez

(10) Patent No.: US 7,907,382 B2
(45) Date of Patent: Mar. 15, 2011

(54) INTEGRATED PROTECTIVE DEVICE AGAINST ELECTRICAL DISCHARGES IN FIXING ELEMENTS

(75) Inventor: Agustin Mariano Martin Hernandez, Madrid (ES)

(73) Assignee: Airbus España, S.L., Madrid (ES)

( * ) Notice: Subject to any disclaimer, the term of this patent is extended or adjusted under 35 U.S.C. 154(b) by 396 days.

(21) Appl. No.: 12/069,574

(22) Filed: Feb. 11, 2008

(65) Prior Publication Data
US 2009/0147429 A1 Jun. 11, 2009

(30) Foreign Application Priority Data
Dec. 10, 2007 (ES) .................................. 200703259

(51) Int. Cl.
*H05F 3/00* (2006.01)
(52) U.S. Cl. ........................................................ 361/218
(58) Field of Classification Search .................... 361/218
See application file for complete search history.

(56) References Cited

U.S. PATENT DOCUMENTS

| | | | | |
|---|---|---|---|---|
| 3,124,190 A * | 3/1964 | Cornell | | 411/520 |
| 3,135,154 A * | 6/1964 | Zenzic | | 411/12 |
| 3,494,243 A * | 2/1970 | Kleinhenn | | 411/403 |
| 3,897,712 A * | 8/1975 | Black | | 411/373 |
| 4,373,842 A * | 2/1983 | Bettini et al. | | 411/377 |
| 4,382,049 A * | 5/1983 | Hofmeister et al. | | 264/40.1 |
| 4,577,450 A * | 3/1986 | Large | | 52/787.12 |
| 4,630,168 A * | 12/1986 | Hunt | | 361/218 |
| 4,755,904 A * | 7/1988 | Brick | | 361/117 |
| 4,905,931 A * | 3/1990 | Covey | | 244/1 A |
| 2007/0196196 A1* | 8/2007 | Schorling et al. | | 411/555 |
| 2009/0226663 A1* | 9/2009 | Hutter, III | | 428/99 |

* cited by examiner

*Primary Examiner* — Ronald W Leja
(74) *Attorney, Agent, or Firm* — Ladas & Parry LLP

(57) ABSTRACT

The invention relates to an integrated device (1) for the protection against electrical discharges of conductive fixing elements (2) between one another or of a fixing element and another conductive element of aircraft, comprising a cap (3) and an o-ring gasket (4) made of non-conductive insulating material, the mentioned integrated device (1) comprising a modified fixing element (2) working together with the cap (3) and the o-ring gasket (4), the fixing element (2) surrounding the cap (3) and the o-ring gasket (4) in a non-conductive manner, thus preventing the possibility of electrical discharges such that in the device (1) the number of necessary components is minimized, the impact in weight for the aircraft being minimum, the modified fixing element (2) further comprising a thread (5) on the outer face of the area that has to be protected.

14 Claims, 2 Drawing Sheets

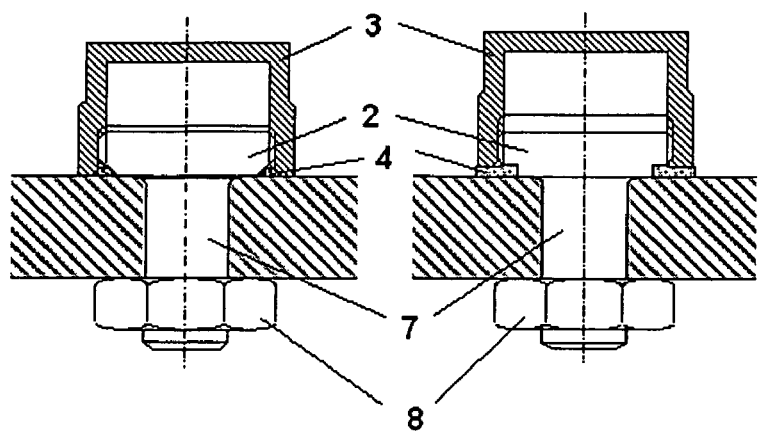
FIG. 3a  FIG. 3b
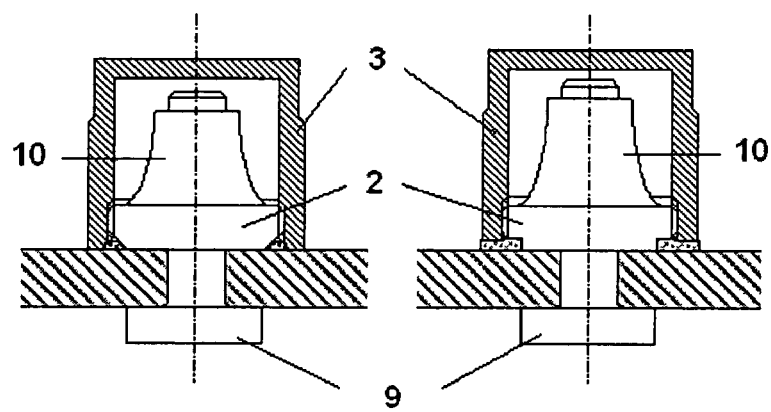
FIG. 4a  FIG. 4b
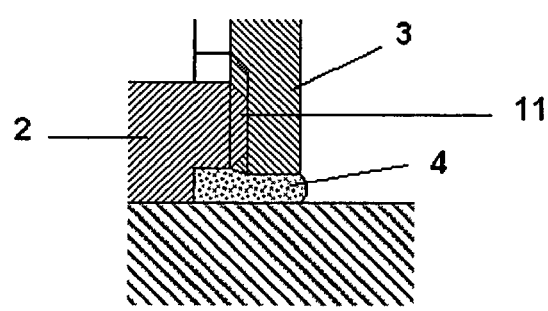
FIG. 5

INTEGRATED PROTECTIVE DEVICE AGAINST ELECTRICAL DISCHARGES IN FIXING ELEMENTS

FIELD OF THE INVENTION

The present invention relates to a device for the protection against electrical discharges in conductive fixing elements, particularly for aircraft, in which the number of components is minimized.

BACKGROUND OF THE INVENTION

In certain mechanical or structural applications it is necessary to effectively prevent the possibility of a spark being generated between two conductive fixing elements, or between a fixing element and another conductive element, which are at a different electric potential. These different electric potentials can be caused by the presence of an electric current, by electric impacts such as lightning or an atmospheric discharge, by a static charge due to friction, etc.

In some applications, preventing these discharges can be a safety requirement, such as for example in the fixings in border areas or of areas inside the fuel storage tanks of aircraft.

There are several known devices for preventing these discharges from occurring between fixing elements, one of which consists of covering the conductive fixing elements with a device in turn comprising a cap and a washer, both made of non-conductive material.

These devices require at least including an additional washer providing a thread in which the corresponding cap will be fixed. This washer increases the thickness that the fixing elements will have to cover (they will then have to have extra length), which affects the way in which the charges are distributed, while at the same time it provides a limited increase in weight, both because of the presence of the washer and because of the necessary extra length of the fixing element. If these devices are used in small amounts, the extra weight will have an insignificant impact, but when these devices are used widely in a structure, the impact of the weight will then be considerable, which is not desirable in certain applications such as in aircraft for example. For that reason, in these applications in which the impact of the weight is highly undesirable, it is necessary to keep the number of components at a minimum and those components must be as small as possible as regards standard protective elements.

The present invention is aimed at solving these drawbacks.

SUMMARY OF THE INVENTION

The present invention thus proposes an integrated device for the protection against electrical discharges of conductive fixing elements, protecting the fixing elements between one another or protecting a fixing element and another conductive element, particularly for aircraft, minimizing the number of necessary components, such that the impact in weight is minimum.

The present invention thus develops a device forming a safe and effective protective barrier against the electrical discharges in fixing elements, or between a fixing element and another component, such that this device is suitable for applications in which the impact in weight is critical.

The device of the invention comprises two components, a cap and an o-ring gasket, working together with a modified fixing element. The cap and the o-ring gasket are made from non-conductive insulating material. Both elements surround the fixing element in question in a non-conductive manner, thus preventing the possibility of electrical discharges.

Other features and advantages of the present invention will be inferred from the following detailed description of an illustrative embodiment of its object in relation to the attached figures.

DESCRIPTION OF THE DRAWINGS

FIGS. 3a and 3b show a sectional view of the integrated device for the protection against electric discharges according to a first and second embodiment of the invention respectively, arranged on a standard conductive fixing screw with a nut, the device being arranged on the side of the screw.

FIGS. 4a and 4b show a sectional view of the integrated device for the protection against electric discharges according to a first and second embodiment of the invention respectively, arranged on a non-permanent standard conductive rivet and bushing, the device being arranged on the side of the bushing.

FIG. 5 shows a sectional view of a detail of the installation of the o-ring gasket of the integrated device for the protection against electric discharges of the invention of FIGS. 3b and 4b.

DETAILED DESCRIPTION OF THE INVENTION

Figure 1:
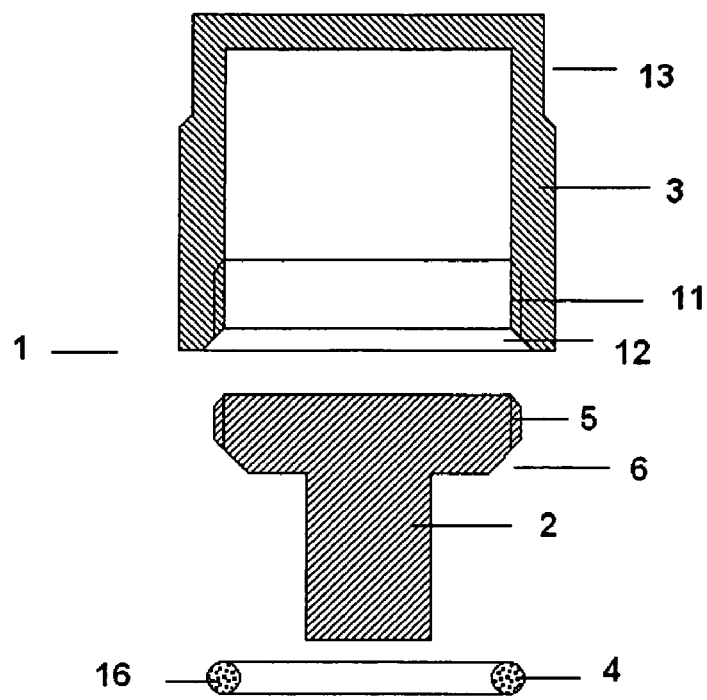
FIG. 1 shows a sectional view of the integrated device for the protection against electric discharges according to a first embodiment of the invention.

The present invention thus proposes an integrated device 1 for the protection against electrical discharges of conductive fixing elements 2 between one another or of a fixing element and another conductive element (not shown), these fixing elements 2 being modified. The integrated device 1 of the invention thus comprises a cap 3 and an o-ring gasket 4, working together with the modified fixing element 2.

The modified fixing element 2 is based on a standard fixing element, further comprising a thread 5 on the outer face of the area that has to be protected (for example the head of a screw). According to a first preferred embodiment of the invention, the thread 5 of the modified fixing element 2 comprises a significant bevel 6 at its lowest part, as shown in FIG. 1. This modified fixing element 2 can be part of a screw 7 or of a rivet 9 with the thread 5 in the head of said element, part of a nut 8 or bushing 10 with the thread 5 at its lower part, etc.

The cap 3 is an open receptacle with a preferably cylindrical shape, closed at one of its ends and with an opening at the other end, the shape and dimensions of which coincide with those of the outer face of the modified fixing element 2. In this area it comprises a thread 11 which is used to fix the cap 3 to the modified fixing element 2 during the installation of the device 1. This thread 11 has self-locking properties, such that the cap 3 is prevented from being separated from the modified fixing element 2, the mentioned thread 11 in turn comprising a significant bevel 12 at its lowest part. According to a preferred embodiment of the invention, the cap 3 comprises a recess 13 at the upper part to facilitate the installation of the mentioned cap 3 with conventional tools during the application of the installation tightening torque. The cap 3 is preferably manufactured from a dielectric material, such as nylon or a high-strength plastic.

The o-ring gasket 4 has the suitable shape and dimensions to be fitted in the slit generated by the bevels 6 and 12 of the lower areas of the modified fixing element 2 and of the cap 3 respectively. This o-ring gasket 4 is made of a flexible material with non-conductive properties such as nitrile rubber or silicone rubber. Once installed, the cap 3 applies pressure on the o-ring gasket 4.

Figure 2:
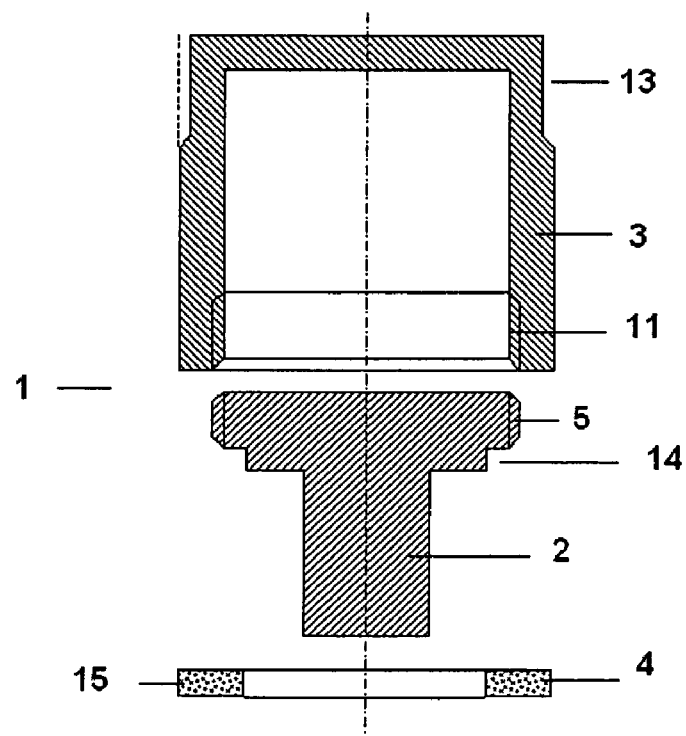
FIG. 2 shows a sectional view of the integrated device for the protection against electric discharges according to a second embodiment of the invention.

According to a second preferred embodiment of the invention, the modified fixing element 2 comprises a groove 14 at the end of the thread 5 instead of the bevel 6, as can be seen in FIG. 2. At the same time the cap 3 does not comprise the bevel 12 in its thread 11, and the o-ring gasket 4 has the suitable shape and dimensions for being coupled to the groove 14 of the modified fixing element 2, further comprising a bead 15 in its outer area, on which the cap 3 will be seated such that the o-ring gasket 4 is in turn fitted to the groove 14 of the fixing element 2 (see FIG. 2).

Once all the components of the device 1 are installed together with the modified fixing element 2, according to FIGS. 3a, 3b, 4a and 4b, said modified fixing element 2 is surrounded in every direction by a non-conductive material, preferably a dielectric material, while at the same time the o-ring gasket 4, once it is pressed by the cap 3, closes all possible gaps between the modified fixing element 2 and the surface on which said element 2 is seated, it being possible to also close imperfections on the mentioned surface or gaps resulting from an unsuitable installation of the cap 3, thus effectively preventing the possibility of an electric spark jumping from one component to another (see FIG. 5).

FIGS. 3a and 3b show an installation example of the protective device 1 of the invention, according to a first and second embodiment thereof respectively, in the particular case in which the modified fixing element 2 comprises a standard screw 7 with a nut 8, the device 1 being arranged in the area of the head of the screw 7.

FIGS. 4a and 4b show another installation example of the protective device 1 of the invention, according to a first and second embodiment thereof respectively, in the particular case in which the modified fixing element 2 comprises a rivet 9 and a bushing 10, the device 1 being arranged in the area of the bushing 10.

In the event of protecting two modified fixing elements 2 from electric discharges between one another, a device 1 with its cap 3 and o-ring gasket 4 would be arranged in at least one of the modified fixing elements 2 to be protected. In the event that a modified fixing element 2 and another conductive element (not shown) are to be protected from electrical discharges, the mentioned device 1 would be arranged on the modified fixing element 2.

The modifications comprised within the scope defined by the following claims can be introduced in the preferred embodiments which have just been described.

The invention claimed is:

1. An integrated device (1) for the protection against electrical discharges of conductive fixing elements (2) between one another or of a fixing element and another conductive element of an aircraft, comprising a cap (3) and an o-ring gasket (4) made of non-conductive insulating material, wherein the fixing element (2) works together with the cap (3) and the o-ring gasket (4), the fixing element (2) being surrounded by the cap (3) and the o-ring gasket (4) in a non-conductive manner, thus preventing the possibility of electrical discharges such that in the device (1) a number of necessary components is minimized, the impact in weight for the aircraft being minimum, wherein the cap (3) comprises a thread (11) for fixing the cap (3) to the fixing element (2).

2. The integrated device (1) for the protection against electrical discharges of conductive fixing elements (2) between one another or of a fixing element and another conductive element of an aircraft according to claim 1, wherein the fixing element (2) is based on a standard fixing element, and further comprises a thread (5) on an outer face of an area to be protected.

3. The integrated device (1) for the protection against electrical discharges of conductive fixing elements (2) between one another or of a fixing element and another conductive element of an aircraft according to claim 2, wherein the thread (5) of the fixing element (2) comprises a bevel (6) at its lower part, the cap (3) in turn comprising a bevel (12) at its lower part such that the o-ring gasket (4) is fitted, once installed, in a slit generated by the bevels (6, 12).

4. The integrated device (1) for the protection against electrical discharges of conductive fixing elements (2) between one another or of a fixing element and another conductive element of an aircraft according to claim 2, wherein the fixing element (2) comprises a groove (14) at the end of the thread (5), the o-ring gasket (4) further comprising a bead (15) in its outer area, such that the o-ring gasket (4) is fitted to the groove (14) of the fixing element (2), the cap (3) in turn being seated on the bead (15) of the o-ring gasket (4).

5. The integrated device (1) for the protection against electrical discharges of conductive fixing elements (2) between one another or of a fixing element and another conductive element of an aircraft according to claim 2, wherein the fixing element (2) is part of a screw (7) with the thread (5) arranged in a head of the screw (7).

6. The integrated device (1) for the protection against electrical discharges of conductive fixing elements (2) between one another or of a fixing element and another conductive element of an aircraft according to claim 2, wherein the fixing element (2) is part of a rivet (9) with the thread (5) arranged in a head of the rivet (9).

7. The integrated device (1) for the protection against electrical discharges of conductive fixing elements (2) between one another or of a fixing element and another conductive element of an aircraft according to claim 2, wherein the fixing element (2) is part of a nut (8) with the thread (5) arranged at a lower part of the nut (8).

8. The integrated device (1) for the protection against electrical discharges of conductive fixing elements (2) between one another or of a fixing element and another conductive element of an aircraft according to claim 2, wherein the fixing element (2) is part of a bushing (10) with the thread (5) arranged at a lower part of the bushing (10).

9. The integrated device (1) for the protection against electrical discharges of conductive fixing elements (2) between one another or of a fixing element and another conductive element of an aircraft according to claim 1, wherein the thread (11) has self-locking properties, preventing the cap (3) from being separated from the fixing element (2).

10. The integrated device (1) for the protection against electrical discharges of conductive fixing elements (2) between one another or of a fixing element and another conductive element of an aircraft according to claim 1, wherein the cap (3) comprises a recess (13) at its upper part to facilitate its installation with conventional tools during application of the installation tightening torque.

11. The integrated device (1) for the protection against electrical discharges of conductive fixing elements (2) between one another or of a fixing element and another conductive element of an aircraft according to claim 1, wherein the cap (3) is made from a dielectric material.

12. The integrated device (1) for the protection against electrical discharges of conductive fixing elements (2) between one another or of a fixing element and another conductive element of an aircraft according to claim 1, wherein the o-ring gasket (4) is made of a flexible material with non-conductive properties.

13. The integrated device (1) for the protection against electrical discharges of conductive fixing elements (2) between one another or of a fixing element and another conductive element of an aircraft according to claim 11, wherein the dielectric material of the cap (3) is nylon or a high-strength plastic.

14. The integrated device (1) for the protection against electrical discharges of conductive fixing elements (2) between one another or of a fixing element and another conductive element of an aircraft according to claim 12, wherein the flexible material with non-conductive properties is nitrile rubber or silicone rubber.

\* \* \* \* \*